US007654249B2

(12) United States Patent
Fischer et al.

(10) Patent No.: US 7,654,249 B2
(45) Date of Patent: Feb. 2, 2010

(54) FUEL PUMP FOR A FUEL SYSTEM OF AN INTERNAL COMBUSTION ENGINE

(75) Inventors: Michael Fischer, Niefern-Oeschelbronn (DE); Matthias Schumacher, Asperg (DE); Christian Wiedmann, Ludwigsburg (DE); Matthias Maess, Stuttgart (DE); Matthias Fischer, Ceske Budejovice (CZ)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 12/186,645

(22) Filed: Aug. 6, 2008

(65) Prior Publication Data

US 2009/0044783 A1 Feb. 19, 2009

(30) Foreign Application Priority Data

Aug. 17, 2007 (DE) ....................... 10 2007 038 984

(51) Int. Cl.
*F02M 57/02* (2006.01)
*F02M 59/46* (2006.01)
*F04B 39/10* (2006.01)
*F16L 55/04* (2006.01)

(52) U.S. Cl. ....................... 123/446; 123/467; 417/540; 138/30

(58) Field of Classification Search ................. 123/446, 123/447, 456, 467; 417/298, 540, 542; 138/30
See application file for complete search history.

(56) References Cited

U.S. PATENT DOCUMENTS 4,729,360 A * 3/1988 Fehrenbach et al. ......... 123/447
5,102,311 A * 4/1992 Lambeck .................... 417/540
6,062,830 A * 5/2000 Kikuchi et al. ............. 417/540
6,062,831 A * 5/2000 Konishi et al. ............. 417/540
6,135,093 A * 10/2000 Kikuchi et al. ............. 123/467
6,213,094 B1 * 4/2001 Onishi et al. ................ 123/447
6,254,364 B1 * 7/2001 Onishi et al. ................ 417/540
6,354,273 B1 * 3/2002 Imura et al. ................. 123/467
6,736,111 B2 * 5/2004 Braun et al. ................ 123/456
7,124,738 B2 * 10/2006 Usui et al. .................. 123/446
7,165,534 B2 * 1/2007 Usui et al. .................. 123/467
7,398,768 B2 * 7/2008 Usui et al. .................. 123/506
7,401,594 B2 * 7/2008 Usui et al. .................. 123/467
2007/0071614 A1 * 3/2007 Inoue ......................... 417/297
2007/0286742 A1 * 12/2007 Inoue ......................... 417/269
2008/0056914 A1 * 3/2008 Usui et al. .................. 417/307
2008/0175735 A1 * 7/2008 Lucas et al. ................. 417/540
2009/0110575 A1 * 4/2009 Munakata et al. ........... 417/437
2009/0185922 A1 * 7/2009 Inoue et al. ................. 417/540

FOREIGN PATENT DOCUMENTS

DE 10 2005 033 634 A1 1/2007

* cited by examiner

*Primary Examiner*—Thomas N Moulis
(74) *Attorney, Agent, or Firm*—Ronald E. Greigg

(57) ABSTRACT

The invention relates to a fuel pump for a fuel system of an internal combustion engine, having a housing and a housing cap joined to the housing. In order to create a fuel pump which in its operation generates little airborne sound, structure-borne sound (vibration amplitudes) and pulsations in a low-pressure region of the fuel pump, it is proposed that the housing cap has at least one damping element, which is embodied as a sandwich construction having at least a first cover layer, a second cover layer, and a damping connection layer disposed between them. The damping connection layer has a markedly higher elasticity and/or higher material damping than the two cover layers, which may be constructed of sheet metal or the housing cap itself.

20 Claims, 2 Drawing Sheets

FUEL PUMP FOR A FUEL SYSTEM OF AN INTERNAL COMBUSTION ENGINE

CROSS-REFERENCE TO RELATED APPLICATIONS

This application is based on German Patent Application No. 10 2007 038 984.3 filed on Aug. 17, 2007, upon which priority is claimed.

BACKGROUND OF THE INVENTION

1. Field of the Invention

The invention relates to a fuel pump for a fuel system of an internal combustion engine, having a housing and a housing cap joined to the housing.

2. Description of the Prior Art

A fuel pump of this kind is known for instance from German Patent Disclosure DE 10 2005 033 634 A1. This fuel pump is a radial piston pump, that can be driven with the aid of an eccentric or cam portion and that can pump fuel from a low-pressure region into a high-pressure region of a fuel system of an internal combustion engine and subject it to high pressure. The fuel pump furthermore has a housing that is closed with a housing cap. In the operation of this radial piston pump, pulsations occur fundamentally in the low-pressure regions and they are damped using a pressure damper disposed in the low-pressure region.

Fuel pumps are also generally known that to vary a pumping rate have a quantity control valve which an be actuated to set an open or closed state. In these fuel pumps, as a result of mechanical contacts that occur in particular upon actuation of the quantity control valve between the parts present in the quantity control valve, structure-borne sound also occurs, which is transmitted to the housing of the fuel pumps.

OBJECT AND SUMMARY OF THE INVENTION

The object of the invention is to create a fuel pump which in its operation generates only slight vibration amplitudes and in particular emits little airborne sound.

According to the invention, it was recognized that the sound generated by a high-pressure pump can be reduced by damping vibration of a housing cap, occurring from pulsations or structure-borne sound in a low-pressure region, and caused for instance by a switching quantity control valve, and that a damping element embodied as a sandwich construction is especially suitable for this purpose. This is because such a damping element reduces the vibration of the housing cap above all in the following way: The damping element, upon deformation, absorbs mechanical energy, especially in the intermediate layer, and converts it into heat by a displacement of the individual layers of the sandwich construction. The reduction in the vibration amplitudes at the housing cap also reduces the emission of airborne sound.

A damping element of his kind is quite compact, so that the outside dimensions of the fuel pump increase only slightly once such a damping element is attached. For known fuel pumps, existing manufacturing and assembly concepts can thus continue to be used with only slight adaptations. Moreover, because of the reduced vibration, the material of the housing cap is less stressed dynamically and therefore has improved durability.

To obtain a robust, temperature-resistant damping element, it is preferred that the two cover layers each be formed by a respective metal sheet.

In order not only to reduce the noise generation but also to ensure that only slight hydro pulsations if any are imported into a low-pressure region of the fuel system, it can be provided that an inner side of the housing cap is subjected to a pressure that prevails in a low-pressure region. The damping element then cooperates directly with the low-pressure region and absorbs shock waves in the low-pressure region that are due to the pulsations. It preferably acts as a supplementary provision for pulsation damping, in addition to a pressure damper that is already present in known fuel pumps. The advantages of the supplementary pulsation damping are apparent especially when the contents of the pulsation spectrum are of high frequency. The supplementary pulsation damping moreover indirectly leads to a reduction in the tendency to vibrate as well and thus to a reduction in sound emission from further portions of the low-pressure region. These further portions as well, since they are coupled hydraulically to the fuel pump via the fuel located in the low-pressure region, can in fact be excited to vibration by the pulsations.

It can be provided that the damping element has a plurality of damping connection layers and corresponding cover layers. As a result, the damping action of the damping element is further improved. Nevertheless, the damping element remains relatively compact and can be made economically.

To attain a wide-surface area and nonpositive-engagement connection of the damping element to the housing cap of the fuel pump, it can be provided that there is a glue layer between the damping element and the housing cap. A glue layer can also be produced quickly and with a small number of work steps and is thus economical.

To further simplify mounting the damping element on the housing cap, a self-adhesive glue layer can be provided, or a glue layer can be used of the kind whose adhesive action ensues only when the damping element and the housing cap are pressed against one another.

If a damping connection layer is disposed between the glue layer and the cover layer, then the damping action of the damping element can be improved still further while increasing the dimensions of the damping element only relatively slightly.

To reduce the outside dimensions of the fuel pump, the damping element can be integrated with the housing cap in such a way that at least a portion of the housing cap forms a layer of the damping element. The reduction in the outside dimensions is due to the fact that only past of the damping element is located on an outer side of the housing cap.

A further possible way of obtaining a compact fuel pump is for at least one region of the housing cap overall to form the damping element. If the entire housing cap is embodied as a damping element, then the result is on the one hand a low number of parts of the fuel pump and on the other a high damping action, since the individual layers of the sandwich construction embody the entire housing cap and thus have a relatively large amount of surface area.

It is especially preferred that the damping element is joined directly to the housing, in particular welded to it. It is advantageous for at least all the cover layers of the damping element to be joined to the housing, in particular by welding. Thus for given requirements in terms of stability of the housing cap, the housing cap can be produced using comparatively little material.

The requisite elasticity of the connection layer can be attained by providing that the connection layer is formed of an elastomer.

BRIEF DESCRIPTION OF THE DRAWINGS

The invention will be better understood and further objects and advantages thereof will become more apparent from the ensuing detailed description of preferred embodiments taken in conjunction with the drawings, in which.

DESCRIPTION OF THE PREFERRED EMBODIMENTS

Figure 1:
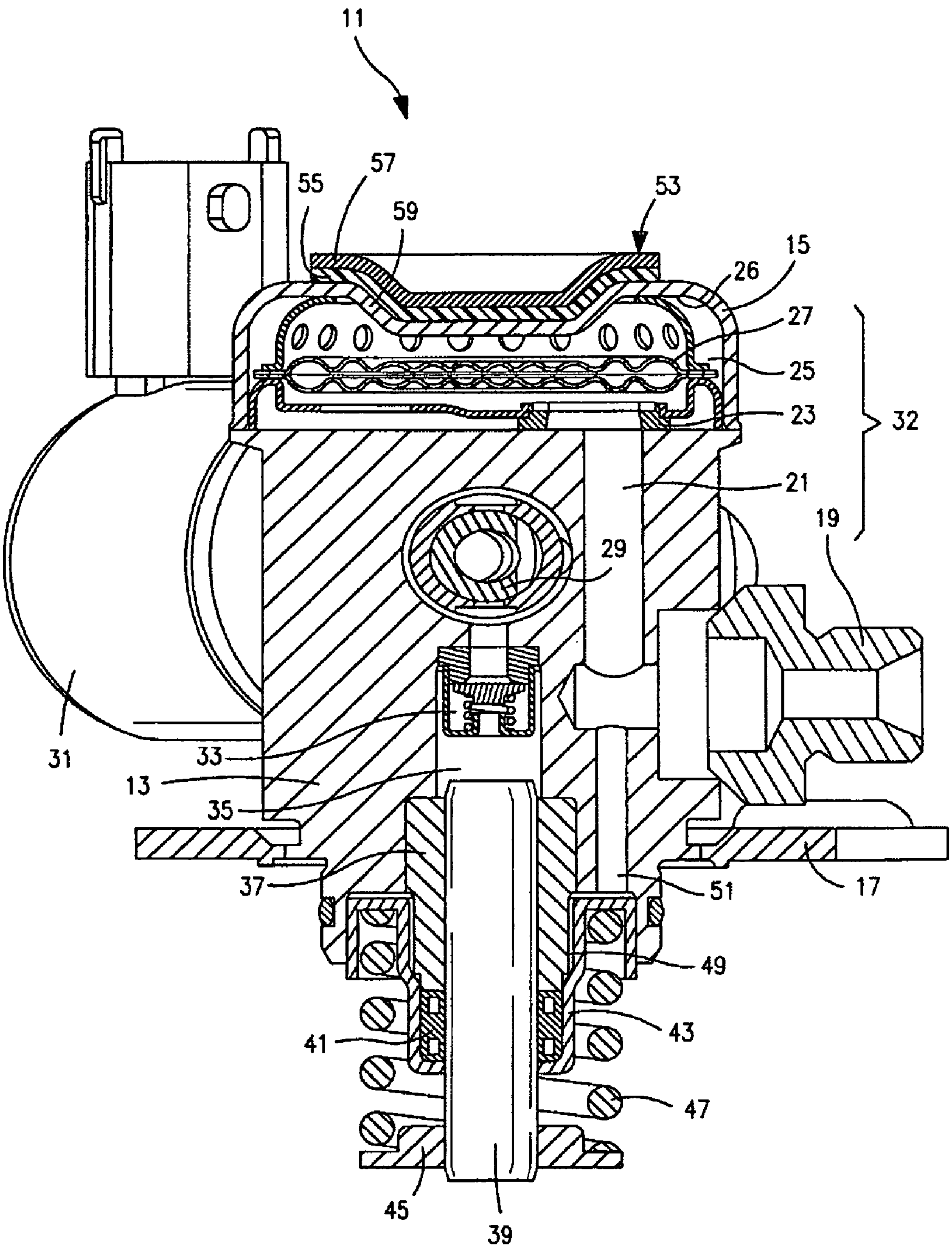
FIG. 1 is a sectional side view of a fuel pump, in a first preferred embodiment of the present invention.

FIG. 1 shows the overall construction of a fuel pump 117 which has an overall cylindrical housing 13 and a housing cap 15 solidly joined to the housing on the top thereof. The fuel pump 11, in its lower region, has a radially protruding securing flange 17 extending all the way around the housing 13. A low-pressure connection 19 is disposed on the housing 137 protruding away radially. This connection communicates via a low-pressure line 21, which is forced as a bore, with a filter 23 that is disposed in a pressure damper chamber 25 formed below the housing cap 15. The pressure damper chamber 25 is bounded laterally and at the top by an inner side 26 of the housing cap 15 and at the bottom by the housing 13. A pressure damper 273 which when viewed from above is overall circular in shape, is located in the pressure damper chamber 25. Alternatively to the embodiment shown a housing 13 can also be provided that is not cylindrical in shape; for instance, it may be prism-shaped or angular and in particular block-shaped.

The pressure damper chamber 25 furthermore communicates, via a line not visible in the sectional view in FIG. 1, with a metering unit 29, which has an electromagnetic actuator 31 connected to an engine control unit (not shown). By means of the electromagnetic actuator 31, the degrees to which the metering unit 29 is opened can be set or adjusted. In an embodiment not shown, instead of the metering unit 29 and the inlet valve 33, an inlet valve device typically known as a "quantity control valve" is provided, which has an electromagnetic actuator by means of which an open or closed state of the quantity control valve can be set or adjusted. All the parts and regions of the fuel pump 11 that communicate hydraulically directly with the low-pressure connection 19 form a low-pressure region 32. This low-pressure region 32 includes in particular the pressure damper chamber 25. The metering unit 29 is connected downstream to an inlet valve 33 embodied as a check valve, which leads to a work chamber 35 of the fuel pump 11. Between the work chamber 35 and a high-pressure region is an outlet valve embodied as a check valve (neither shown).

The work clamber 35 has a cylindrical bush 37, in which a pump piston 39 is supported axially displaceably. Below the cylindrical bush 37 is a sealing element 41, which is retained by a seal holder 43. Somewhat above a lower end of the pump piston 39 is a spring holder 45 of circular-annular cross section that is solidly joined to the pump piston. A spring 47 is tensed between the spring holder 45 and the seal holder 43. Above the sealing element 41 is a hollow chamber 49, which is defined by the seal holder 43, the cylindrical bush 37 and the housing 13, and which communicates with the low-pressure connection 19 through a return line 51 formed by a bore.

A damping element 53 embodied as a sandwich construction is disposed on the housing cap 15. This damping element 53 has three layers; a middle layer is a connection layer 55 formed of polymer, and an upper layer is a cover layer 57 of sheet metal. A lower layer 59 is formed by the housing cap 15 itself.

In operation of the fuel pump 11, the pump piston 39 is pressed upward at regular intervals, for instance by a cam or eccentric portion, so that the work chamber 35 decreases in size. At the times when the pump piston 39 is not being pressed upward, the spring 47 assures that the pump piston 39 moves downward and thus increases the size of the work chamber 35.

Fuel which is at a relatively low pressure is delivered to the low-pressure connection 19. From the low-pressure connection 19, the filet passes via the low-pressure line 21 to reach the pressure damper chamber 25, and therefore the inner side 26 of the housing cap is subjected to a pressure prevailing in the low-pressure region 32. Upon an enlargement of the work chamber 35 because of a downward motion of the pump piston 39 (intake stroke), fuel from the pressure damper chamber 25 reaches the work chamber 35 via the open metering unit 29 and the also-open inlet valve 33. Upon a reduction in size of the work chamber 35 following the intake stroke, because of an upward motion of the pump piston 39 (supply stroke), the fuel located in the work chamber 35 is subjected to a pressure and pumped into the high-pressure region via the outlet valve of the fuel pump 11. By means of a suitable setting of a degree of opening of the metering unit 29 with the aid of the electromagnetic actuator 31, a pumping rate of the fuel pump 11 is set. In the embodiment not shown that has the quantity control valve, this quantity control valve is actuated at suitable times to set a defined pumping rate of the fuel pump 11. In this process, for setting a reduced pumping rate compared to a maximum pumping quantity, a portion of the fuel located in the work chamber 35 is not pumped into the high-pressure region but instead is returned to the low-pressure region 32. The engine control unit executes a control or regulating method accordingly. In operation of the fuel pump 11, a slight fuel quantity reaches a region between the pump piston 39 and the cylindrical bush 37 and accumulates in the hollow chamber 49. This leak fuel quantity is returned to the low-pressure region 32 with the aid of the return line 51.

Because of the constant alternation between intake stroke and pumping stroke and because of abrupt interruption in the volumetric flows in a quantity control valve—if present—an uneven flow of fuel into the low-pressure region 32 results. This causes pulselike pressure fluctuations pulsations) in the low-pressure region 32, which if they were not damped could impair the operation of the fuel pump 11, or of a fuel system to which the fuel pump 11 belongs. A fundamental frequency of the pulsations, depending on the operating state of the fuel pump 11, is typically on the order of magnitude of approximately 15 Hz to 200 Hz. Because of the nonharmonic, uneven pumping, the pulsations include higher-frequency harmonics and broadband spectral contents at higher frequencies.

Because of the pressure fluctuations, caused by the pulsations, inside the low-pressure region 32 and thus inside the pressure damper chamber 25 as well, the housing cap 15 is deformed outward and inward in alternation. The damping element 53 is deformed accordingly as well. The connection layer 55 and the cover layers 57 and 59 of the damping element 53 shift relative to one another. In the process, the cover layers 57 and 59 become curved, and the connection layer 55 experiences shear stress. In this deformation, the damping element 53 absorbs mechanical energy and converts it into heat. In this way, the pulsations in the low-pressure region 32 are damped, and sound generation in the housing cap 15 caused by these deformation motions is reduced as well.

In particular, vibrations in the form of natural vibration, in particular bending vibrations of the housing cap 15, are at least partially eliminated. The term "natural vibration form" is understood to mean a vibrational motion caused by the nature of the housing cap 15 and characterized among other factors by a resonant frequency. Its elimination is accomplished in that certain natural vibration forms are damped and/or resonant frequencies of certain natural vibration forms are altered in such a way that in the operating states intended for the fuel pump 11, these natural vibration forms occur at most with only a slight amplitude. The nature of the housing cap 15 is thus defined by the damping element 53 in such a way that the pulsations cannot, or can to only a limited extent, engender independent vibrations of the housing cap 15, especially at a frequency that is within the range of audible sound.

Since the housing cap 15 is exposed directly to the pressure prevailing in the low-pressure region 32, interactions occur between the low-pressure region 32 and the housing cap. As a result, the housing cap 15, damped with the aid of the damping element 53, also brings about pulsation damping of the fuel in the low-pressure region 32. This pulsation damping occurs in addition to the pulsation damping effected by the pressure damper 27.

Which natural vibration forms of the housing cap 15 have to be damped and to what extent depends in particular on the precise construction of the fuel pump 11 and on the planned operating states of the fuel pump 11. It is therefore necessary that the nature of the damping element 53—in particular, the properties of the connection layer 55 and the thickness of the individual layers 55, 57 and 59—be adapted to an intended use for the fuel pump 11.

Figure 2:
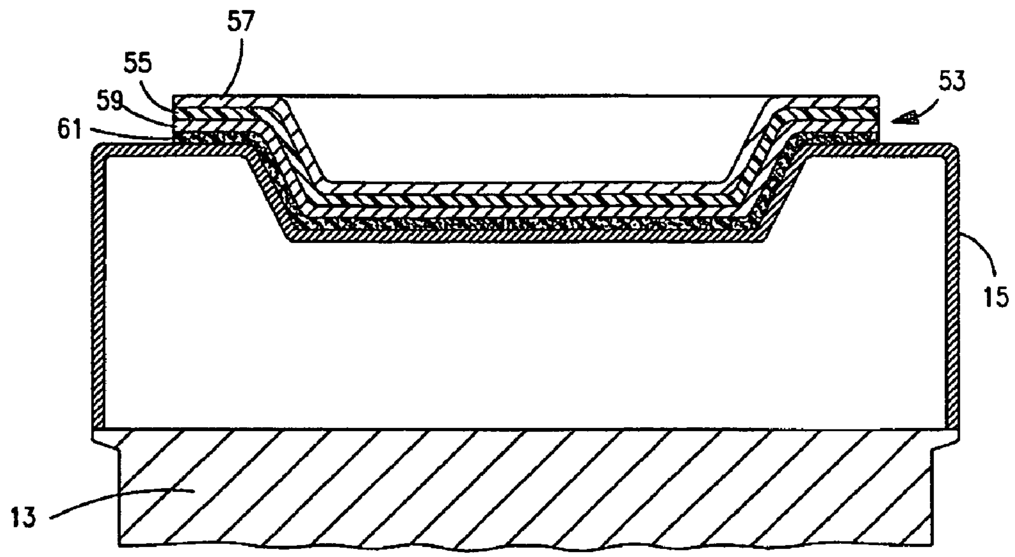
FIG. 2 is a sectional side view of a housing cap with a damping element, in a second preferred embodiment.

Such an adaptation can thus lead for instance to the embodiment shown in FIG. 2, in which the damping element 53 has a total of three layers once again, and there is an adhesive or glue layer 61 between the damping element 53 and the housing cap 15. This glue layer 61 is applied to the damping element 53 in the manufacture of the damping element, and in the manufacture of the fuel pump 11, the damping element 53 together with the glue layer 61 is pressed onto the housing cap 15. The glue layer 61 is self-adhesive. In an embodiment not shown, however, the glue layer 61 is pressure-activated; that is, it does not develop its adhesive action until the damping element 53 and the housing cap 15 are pressed against one another.

Figure 3:
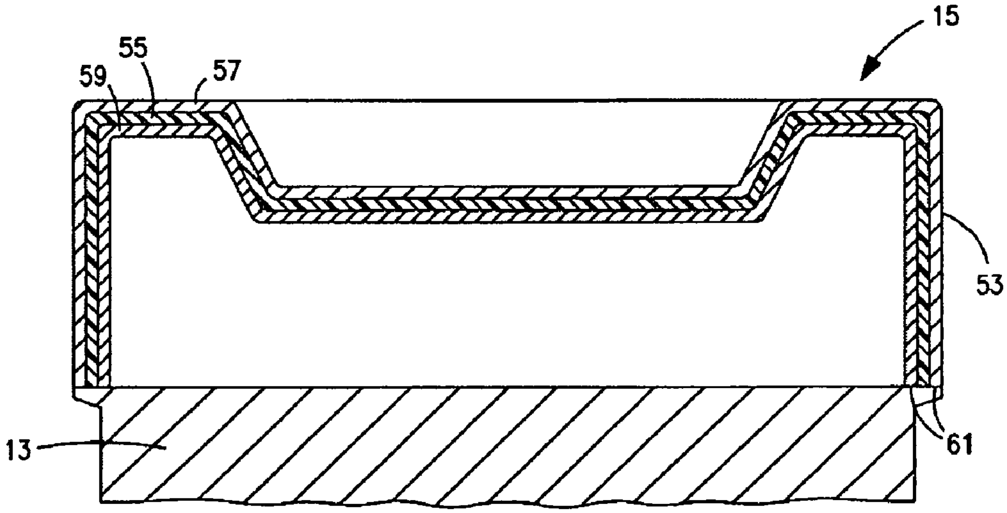
FIG. 3 is a view similar to FIG. 2 of a third preferred embodiment.

As shown in FIG. 3, the housing cap 15 can itself be embodied as a damping element 53 also. The damping element 53 again has the connection layer 55, which is sandwiched by two cover layers 57 and 59. The two cover layers 57 and 59 are formed by metal sheets and are welded at their edges 62 to the housing 13. In an embodiment not shown, only one cover layer 57 is welded to the housing 13.

In an embodiment not shown, the entire housing cap 15 is not embodied as the damping element 53; instead, only a portion of the housing cap 15 forms the damping element 53. In a further embodiment, not shown, cover layers and connection layers are disposed in alternation not only above the housing cap 15, or in other words outside the pressure damper chamber 25, but also below the housing cap 15, or in words inside the pressure damper chamber 25. The portion of the housing cap 15 that is directly contacting the layers of the damping element 53 thus itself acts as a layer of the damping element 53.

Figure 4:
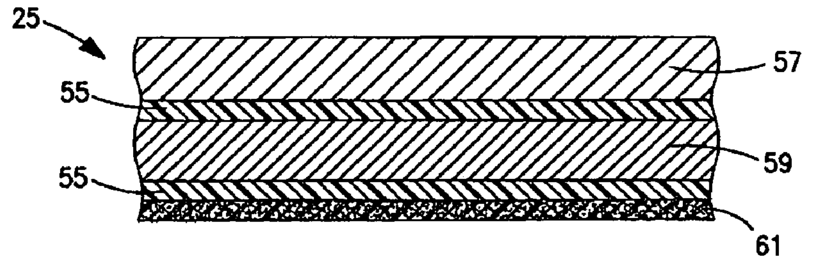
FIG. 4 is a sectional side view of a portion of a damping element in a fourth preferred embodiment, shown greatly enlarged.

A further possible way of realizing a damping element that can be glued to the housing cap 15 is shown in FIG. 4. This damping element 25 has two cover layers 57 and 59, each made from sheet metal, below each of which is a respective connection layer 55, which is formed from an elastomer. The glue layer 61 is applied to the lowermost connection layer 55 in FIG. 4. Also in this embodiment, the number and thickness of the individual layers 55, 57, 59 and 61 can be varied in order to meet special requirements made of a certain fuel pump 11 or for the sake of planned operating states of the fuel pump 11 (such as a planned range of a stroke frequency of the pump piston 39). In the other embodiments, the connection layer may likewise be formed of an elastomer.

The foregoing relates to preferred exemplary embodiments of the invention, it being understood that other variants and embodiments thereof are possible within the spirit and scope of the invention, the latter being defined by the appended claims.

We claim:

1. A fuel pump for a fuel system of an internal combustion engine, comprising:
- a housing;
- a housing cap joined to the housing;
- at least one damping element attached to the housing cap, which damping element is embodied as a sandwich construction having at least a first cover layer and a second cover layer and a damping connection layer disposed between the first cover layer and the second cover layer, wherein the damping connection layer has a markedly higher elasticity and/or higher material damping than the two cover layers.

2. The fuel pump as defined by claim 1, wherein the two cover layers are each formed by a metal sheet.

3. The fuel pump as defined by claim 1, wherein an inner side of the housing cap is subjected to a pressure prevailing in a low-pressure region of the fuel pump.

4. The fuel pump as defined by claim 2, wherein an inner side of the housing cap is subjected to a pressure prevailing in a low-pressure region of the fuel pump.

5. The fuel pump as defined by claim 1, wherein the damping element has a plurality of damping connection layers which are layered in between corresponding cover layers.

6. The fuel pump as defined by claim 2, wherein the damping element has a plurality of damping connection layers which are layered in between corresponding cover layers.

7. The fuel pump as defined by claim 3, wherein the damping element has a plurality of damping connection layers which are layered in between corresponding cover layers.

8. The fuel pump as defined by claim 1, further comprising a glue layer disposed between the damping element and the housing cap.

9. The fuel pump as defined by claim 2, further comprising a glue layer disposed between the damping element and the housing cap.

10. The fuel pump as defined by claim 3, further comprising a glue layer disposed between the damping element and the housing cap.

11. The fuel pump as defined by claim 4, further comprising a glue layer disposed between the damping element and the housing cap.

12. The fuel pump as defined by claim 8, wherein the glue layer is self-adhesive, or an adhesive action ensues only when the damping element and the housing cap are pressed against one another.

13. The fuel pump as defined by claim 8, wherein a damping connection layer is disposed between the glue layer and a cover layer.

14. The fuel pump as defined by claim 12, wherein a damping connection layer is disposed between the glue layer and a cover layer.

15. The fuel pump as defined by claim 1, wherein at least one portion of the housing cap forms a layer of the damping element.

16. The fuel pump as defined by claim 2, wherein at least one portion of the housing cap forms a layer of the damping element.

17. The fuel pump as defined by claim 3, wherein at least one portion of the housing cap forms a layer of the damping element.

18. The fuel pump as defined by claim 1, wherein an overall region of the housing cap forms the damping element.

19. The fuel pump as defined by claim 1, wherein the damping element is joined directly to the housing, in particular welded to it.

20. The fuel pump as defined by claim 1, wherein the connection layer is formed of an elastomer.

* * * * *